United States Patent [19]

Hench et al.

[11] Patent Number: 4,851,373

[45] Date of Patent: Jul. 25, 1989

[54] LARGE SOL-GEL SIO$_2$ MONOLITHS CONTAINING TRANSITION METAL AND THEIR PRODUCTION

[75] Inventors: Larry L. Hench; Shi-Ho Wang, both of Gainesville, Fla.

[73] Assignee: University of Florida, Gainesville, Fla.

[21] Appl. No.: 704,917

[22] Filed: Feb. 25, 1985

[51] Int. Cl.$^4$ .......................... B01J 13/00; C03C 3/04
[52] U.S. Cl. .................................. 501/12; 252/315.01; 252/315.6; 264/42
[58] Field of Search .................... 252/315.01, 315.6; 501/12, 71

[56] References Cited

U.S. PATENT DOCUMENTS 2,281,810  5/1942  Stone et al. .................. 252/315.6 X
2,834,739  5/1958  Becker et al. ................ 252/315.6 X

OTHER PUBLICATIONS

Handbook of Chemistry and Physics, edited by C. D. Hodgman et al., 35th Edition, Chemical Rubber Publ. Co., Cleveland, Ohio (1953), pp. 1010–1011.

*Primary Examiner*—Richard D. Lovering
*Attorney, Agent, or Firm*—Finnegan, Henderson, Farabow, Garrett & Dunner

[57] ABSTRACT

Sol-gel monoliths containing $SiO_2$ and optionally $B_2O_3$, $Na_2O$, $Li_2O$, $TiO_2$, $Al_2O_3$ and mixtures thereof, and a transition metal having an atomic number from 21–28 made by mixing water, a $SiO_2$ precursor, a non-precipitating salt of a transition metal and mellitic acid to form a sol, gelling the sol, aging the gelled sol, drying the aged gelled sol and densifying by heating to from about 500° C. to about 1350° C.

13 Claims, No Drawings

LARGE SOL-GEL SIO₂ MONOLITHS CONTAINING TRANSITION METAL AND THEIR PRODUCTION

This invention was made with Government support under F49620-83-C-0072 awarded by the Air Force. The Government has certain rights in this invention.

BACKGROUND OF THE INVENTION

1. Field of the Invention

This invention relates to a novel process for producing large sol-gel $SiO_2$ containing monoliths in which a transition metal is homogeneously distributed throughout on substantially a molecular basis and products obtained by the practice of the novel process.

2. Description of the Prior Art

Prior developments, see copending applications Ser. Nos. 583,741 A24178 and 924,179 all filed Feb. 27, 1984, have shown how to produce rapidly large optically transparent $SiO_2$ containing monoliths of $SiO_2$, $Li_2O$-$SiO_2$, $Na_2O$-$SiO_2$, $Al_2O_3$-$B_2O_3$-$SiO_2$, $Al_2O_3$-$SiO_2$, $Li_2O$-$Al_2O_3$-$SiO_2$, $Li_2O$-$Al_2O_3$-$TiO_2SiO_2$ using special drying control chemical additives. The present invention provides a novel process for introducing transition metal elements or compounds into $SiO_2$ containing sol-gel systems and novel products which are derived from the practice of the invention. The newly discovered process is based upon the discovery and use of mellitic acid, also called benzene hexacarboxylic acid [$C_6(CO_2H)_6$ or $C_6(COOH_6)$], whose structural formula may be shown schematically as:

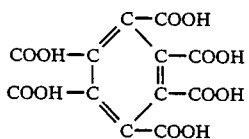

SUMMARY OF THE INVENTION

The present invention provides a novel process for making $SiO_2$ containing optically transparent, amorphous monoliths and novel products which use mellitic acid in the process of preparing sol-gel glass systems containing $SiO_2$, for the purpose of incorporating into the monoliths transition metals homogeneously distributed therethrough on substantially a molecular basis. By the practice of the present invention amorphous monoliths can be made rapidly and without (i) precipitation, (ii) formationn of an inhomogeneous gel, or (iii) crystallization. Accordingly, by the practice of the present invention one can readily produce noncrystalline (amorphous) homogeneous silica gels and glasses of variable indices of refraction and of optical filter quality rapidly and routinely with a wide variety of transition metal optical absorption bands.

DETAILED DESCRIPTION OF INVENTION

Six steps are used in making the monolithic amorphous silica containing gels and glasses containing transition metals: (1) mixing, (2) casting, (3) gelation, (4) aging, (5) drying, and (6) densification. The transition metals which can be used in the present invention are those from atomic number 21 to atomic number 28 and include Sc, Ti, V, Cr, Ni, Co, Mn and Fe. Copper was tried but did not work as it precipitated. The first step involves mixing the constituents in the ratio from 0.01 mole to 0.1 mole mellitic acid with from 10 to 25 moles of distilled water (16 moles is preferred) for 1 to 20 minutes (5 minutes is preferred) at 0°-50° C. (room temperature is preferred) followed by adding to the solution 0.5-2.55 moles of a $SiO_2$ precursoro such as tetramethoxysilane (TMS) (1 mole is preferred) and mixing for an addition 1-20 minutes (5 minutes is preferred). Any $SiO_2$ precursor can be used, alone or in combination with one or more of $B_2O_3$, $Na_2O$, $Li_2O$, $TiO_2$ andn $al_2O_3$ precursors, as disclosed in said aforementioned copending applications, here incorporated by reference. Next, a concentration range from 0.001 mole to 0.5 moles of transition metal, preferably in the acetate or nitrate form is added to the mellitic acid-TMS solution keepig the ratio of transition metal/mellitic acid less than 1.0 to avoid a precipitate forming. The molar concentration of transition metal, and thereby the mellitic acid, selected to produce a required or desired intensity of optical absorption in the gel-glass.

The transition metals are generally used, as salts in either the acetate or nitrate form. The principal requirement is that they will enter into the sol and proceed through to gellation without precipitating out. Cobalt, for example, can be used in either form. Other salt forms can be used, such as sulfate, carbonate, etc. as long as no precipitate occurs. The transition metal is added to the solution while increasing tthe temperature to 60°-90° C. during 20-80 minutes of mixing to accelerate hydrolysis of the TMS while incorporating the transition metal ions homogeneously into the silica sol network as it is being formed.

Second, the thoroughly mixed homogeneous silica solution is cooled to about 60° C. or less, then, cast into molds to form the required or desired shape of an optical component. The molds are immediately covered and sealed. The molds are maintained at 60° C. or lower until gelation (Step 3) (gelation time increases with lower temperature) and for an additional one hour to fifteen hours after gelation, following by heating to 75° C. to 100° C. for approximately 10 to 30 hours (15 hours being preferred) to age the gels (Step 4) and increase their strength and density. Drying procedures (step 5) follow as previouosly described in the aforementioned copending applications, namely, heating from 70° C.-150° C. for 18-96 hours. Finally (Stepp 6), densification is achieved by firing in ambient atmosphere between 500°-1350° C. for one to three days depending on the concentration of the transition metal and density required.

Specific examples follow for transition metals: Co, Cr, Ni.

SPECIFIC EXAMPLE #1

Cobalt Colored Silica 3.42 g of mellitic acid are added to 300 cc of distilled water at room temperature and mixed for 5 minutes with a magnetic stirrer. To the above solution is added 150 cc of TMS at room temperature while mixing for 5 minutes. 2.50 g of cobalt acetate tetrahydrate (TMAc) is added to the mellitic acid-TMS-H₂O solution while mixing and simultaneously increasing the solution temperature to 85° C. for a period of no more than 25 minutes. The intimately mixed TMAc-TMS-H₂O solt is case from its heated vessel into a mold of a shape corresponding to the desired final object. The mold mlaterial is polystyrene butt typically may be polyethylene, polystyrene, or polytetrafluoroethylene (PTFE). The length of time for casting or mold filling is about 5 minutes but can be up to 110 minutes. The filled mold is covered and its temperature is reduced to 60° C. to promote gelation and within 115 minutes the solid object resulting takes the shape of and surface finish of the mold. The solid is aged in the mold initially at 60° C. for 10 hours afollowed by an increase to 95° C. for 15 hours. The aged cobalt-silica gel is removed from the mold and dried initially at 100° C. with a gradual increase to 200° C. over 96 hours in a container with a loose cover. The fully dried cobalt-silica gel is heated up to 500° C. to eliminate residual organics. The optical component resulting is transparent but colored pink by the cobalt addition and has a BET surface area of 600 m$^2$/g and a density of 1.3 to 1.4 g/cc. Additional densification was achieved by heating to 900° C. to obtain a deep blue color and 90% of theoretical density. Densification occurs in the heating range of from about 500° C. to about 1350° C. resulting in a transparent optical object with a color varyingn from pink to blue depending upon temperature and time of densification.

SPECIFIC EXAMPLE #2

Chromium Colored Silica 25.65 g mellitic acid are added to 300 cc of distilled water at room temperature and mixed for 5 minutes with a magnetic stirrer. 150 cc of TMS at room temperature are added to the solution while mixing for 5 minutes. To the mellitic acid-TMS-H$_2$O solution is added 3.94 g of chromium acetate tetrahydrate (TMAc) while mixing and simultaneously increasing the solution temperature to 85° C. for a period of no more than 25 minutes. The intimatetly mixed TMAc-TMS-H$_2$O sol is cast from its heated vessel into a mold of a shape that corresponds to the desired final object. The mold material is polystyrene, but typically may be polyethylene, polystyrene, or PTFE. The length of time for casting or mold filling is 10 minutes but can be up to 110 minutes. The filled mold is covered and the temperature is reduced to 60° C. prior to gelation. Gelation occurs in the mold at 60° C. within 115 minutes with the solid object resulting taking the shape of and surface finish of the mold. The solid is aged in the mold initially at 60° C. for 10 hours followed by an increase to 95° C. for 15 hours. The aged chromium-silica gel is removed from the mold and dried initially at 100° C. with a gradual increase to 200° C. over 96 hours in a container with a loose cover. The fully dried chromium-silica gel is then heated up to 500° C. to eliminate residual organics. The optical component resulting is transparent but colored black by the chromium addition and has a BET surface area of 600 m$^2$/g and a density of 1.3 to 1.4 g/cc. Additional densification is achieved at 850° C. and the color is brown. In general, densification can be achieved by heating from 500° C. to 1350° C. resulting in a transparent optical object with a color varying from green to gray to black depending upon the temperature and time of densification.

SPECIFIC EXAMPLE #3

Nickel Colored Silica 8.55 g mellitic acid are added to 300 cc of distilled water at room temperature and mixed for 5 minutes with a magnetic stirrer. 150 cc of TMS at room temperature are added to the solution while mixing for 5 minutes. To the mellitic acid-TMS-H$_2$O solution is added 1.90 g of nickel acetate 1/4 H$_2$O tetrahydrate (TMAc) while mixing and simultaneously increasing the solution temperature to 85° C. for a period no more than 25 minutes. The intimately mixed TMAc-TMS-H$_2$O sol is cast from its heated vessel into a mold of a shape that corresponds to the desired final object. The mold material is polystyrene, but typically can be polyethylene, polystyrene, or PTFE. The length of time for casting or mold filling is 20 minutes, but can be up to 110 minutes. The filled mold is covered and the temperature is reduced to 60° C. prior to gelation. Gelation occurs in the mold at 60° C. within 115 minutes with the solid object resulting taking the shape of and surface finish of the mold. The solid is aged in the mold initially at 60° C. for 10 hours followed by an increase to 95° C. for 15 hours. The aged nickel-silica gel is removed from the mold and dried initially at 100° C. with a gradual increase to 200° C. over 96 hours in a container with a loose cover. The fully dried nickel-silica gel is then heated up to 500° C. to eliminate residual organics. The optical component resulting is transparent but colored greenish blue by the nickel addition and has a BET surface area of abou 600 m$^2$/g and a density of abou 1.3 to 1.4 g/cc. Additional densification was achieved by heating to 850° C. and the color is green. In general, densification can be achieved by heating from 500° C. to 1350° C. resulting in a transparent optical object with a color varying from blue to green depending upon temperature and time of densification.

SPECIFIC EXAMPLE #4

Cobalt Colored Silica 3.42 mellitic acid are added to 300 cc of distilled water at room temperature and mixed for 5 minutes with a magnetic stirrer. To the above solution is added 150 cc of TMS at room temperature while mixing for 5 minutes. 2.50 g of cobalt nitrate tetrahydrate are added to the DCCA-TMS-H$_2$O solution while mixing and simultaneously increasing the solution temperature to 85° C. for a period no moreo than 25 minutes. The intimately mixed mellitic acid-TMS-H$_2$O sol is cast from its heated vessel into a mold of a shape that corresponds to the desired final object. The mold material is polystyrene but typically may be polyethylene, polystyrene, or PTFE. The length of time for casting or mold filling is 40 minutes but can be up to 110 minutes. The filled mold is covered and the temperature is reduced to 60° C. prior to gelation. Gelation occurs in the mold at 60° C. within 115 minutes with the solid object resulting taking the shape of and surface finish of the mold. The solid is aged in the mold initially at 60° C. for 10 hours followed by an increase to 95° C. for 15 hours. The aged cobalt-silica gel is removed from the mold and dried initially at 100° C. with a gradual increase to 200° C. for 96 hours in a container with a loose cover. The fully dried cobalt-silica gel is then heated up to 500° C. to eliminate residual organics. The optical component resulting is transparent but colored pink by the cobalt addition and has a BET surface area of about 600 m$^2$/g and a density of about 1.3 to 0.14 g/cc. Additional densification was achieved at 900° C. to obtain a deep blue color. Densification can be achieved by heating from 500° C. to 1350° C. resulting in a transparent optical object with a color varying from pink to blue to grey to black depending upon temperature and time of densification.

Having now fully described the invention, it will be apparent to one of ordinary skill in the art that many changes and modifications can be made thereto without departing from the spirit and scope of the invention as set forth herein.

What is claimed is:

1. A process for producing sol-gel-derived monoliths containing SiO$_2$ and a transition metal comprising the steps of:
   (a) mixing water, a SiO$_2$ precursor, a non-precipitating salt of a transition metal, and mellitic acid to form a sol, wherein the amount of mellitic acid is sufficiently great to produce, together with the transition metal, a monolith having an optical absorption of preselected intensity and sufficiently small to avoid precipitation of the transition metal;
   (b) gelling the sol;
   (c) aging the gelled sol; and
   (d) drying the aged gelled sol to form a monolith.

2. A process according to claim 1 wherein the dried sol is densified by heating to from about 500° C. to about 1350° C.

3. A process according to claim 1, wherein the mixing step includes a precursor selected from the group consisting of precursors of B$_2$O$_3$, Na$_2$O, Li$_2$O, TiO$_2$, Al$_2$O$_3$ and mixtures thereof.

4. A process according to claim 1, wherein the transition metal has an atomic number from 21–28.

5. A sol-gel derived, optical monolith made by the process of claim 1.

6. A process for producing sol-gel-derived monoliths containing SiO$_2$ and na transition metal comprising the steps of:
   (a) mixing water, a SiO$_2$ precursor, a non-precipitating salt of a transition metal, and mellitic acid to form a sol, wherein the ratio of the salt of a transition metal to mellitic acid is less than 1.0;
   (b) gelling the sol;
   (c) aging the gelled sol; and
   (d) drying the aged gelled sol to for a monolith.

7. A process for producing sol-gel derived monoliths containing SiO$_2$ and a transition metal comprising the steps of:
   (a) mixing water, a SiO$_2$ precursor, a non-precipitating salt of a transition metal, and mellitic acid in a ratio of 10–25 moles water to 0.5–2.5 moles of said SiO$_2$ precursor to 0.001–0.5 moles of said salt of said transition metal to 0.01–0.1 moles of mellitic acid to forma sol;
   (b) gelling the sol;
   (c) aging the gelled sol; and
   (d) drying the aged gel sol to form a monolith.

8. A sol-gel derived, optical monolith made by the process of claim 7.

9. A process for producing sol-gel derived optical monoliths containing sIO$_2$ comprising the steps of:
   (a) mixing a SiO$_2$ precursor, water and mellitic acid to form a sol, wherein the amount of mellitic acid is sufficiently great to produce, together with the transition metal, a monolith having an optical absorption of preselected intensity and sufficiently small to avoid precipitation of the transition metal;
   (b) gelling the sol;
   (c) aging the gelled sol; and
   (d) drying the aged gelled sol to form a monolith.

10. A process according to claim 7 wherein the mixing steps includes a precursor selected from the group consisting of precursors of B$_2$O$_3$, Na$_2$O, Li$_2$O, TiO$_2$, Al$_2$O$_3$ and mixture thereof.

11. A sol-gel derived, optical monolith made by the process of claim 9.

12. The process for producing sol-gel derived optical monoliths containing SiO$_2$ comprising the steps of:
   (a) mixing water, a SiO$_2$ precursor and mellitic acid to form a sol, wherein the constituents are present in the mixing step in the ratio of 10–25 moles water to 0.5–2.5 moles SiO$_2$ precursor to 0.01–0.1 moles mellitic acid;
   (b) gelling the sol;
   (c) aging the gelled sol; and
   (d) drying the aged gell sol to form a monolith.

13. A sol-gel derived, optical monolith made by the proces of claim 12.

* * * * *